(12) United States Patent
Kaneko et al.

(10) Patent No.: US 9,542,964 B2
(45) Date of Patent: Jan. 10, 2017

(54) PIVOT ASSEMBLY BEARING AND HARD DISK DRIVE DEVICE

(71) Applicant: MINEBEA CO., LTD., Kitasaku-gun, Nagano (JP)

(72) Inventors: Atsushi Kaneko, Nagano (JP); Kunihiro Tsuchiya, Tomioka (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 14/924,268

(22) Filed: Oct. 27, 2015

(65) Prior Publication Data
US 2016/0118068 A1 Apr. 28, 2016

(30) Foreign Application Priority Data

Oct. 28, 2014 (JP) ................................. 2014-219565
Oct. 28, 2014 (JP) ................................. 2014-219566

(51) Int. Cl.
| F16C 21/00 | (2006.01) |
| G11B 5/48 | (2006.01) |
| F16C 33/76 | (2006.01) |
| F16C 37/00 | (2006.01) |

(52) U.S. Cl.
CPC ............ *G11B 5/4813* (2013.01); *F16C 21/00* (2013.01); *F16C 33/762* (2013.01); *F16C 33/765* (2013.01); *G11B 5/4806* (2013.01); *F16C 37/007* (2013.01); *F16C 2370/12* (2013.01)

(58) Field of Classification Search
None
See application file for complete search history.

(56) References Cited

U.S. PATENT DOCUMENTS

| 5,402,023 A * | 3/1995 | Nakanishi | H02K 5/124 |
| | | | 310/67 R |
| 5,855,438 A * | 1/1999 | Lee | F16C 17/107 |
| | | | 384/112 |
| 6,574,076 B1* | 6/2003 | Koyama | G11B 5/5521 |
| | | | 360/265.3 |
| 8,995,093 B2* | 3/2015 | Nanasawa | G11B 5/5569 |
| | | | 360/265.2 |
| 2002/0006015 A1* | 1/2002 | Mouri | F16C 19/54 |
| | | | 360/265.2 |
| 2004/0120079 A1* | 6/2004 | Tsuchiya | F16C 19/54 |
| | | | 360/265.2 |
| 2004/0136116 A1* | 7/2004 | Koyama | G11B 5/4813 |
| | | | 360/265.2 |
| 2004/0136629 A1* | 7/2004 | Mori | F16C 19/08 |
| | | | 384/504 |
| 2007/0194644 A1* | 8/2007 | Kanatani | H02K 7/09 |
| | | | 310/90 |

FOREIGN PATENT DOCUMENTS

| JP | H01-277375 A | 11/1989 |
| JP | 2013-048005 A | 3/2013 |

* cited by examiner

*Primary Examiner* — Carlos E Garcia
(74) *Attorney, Agent, or Firm* — Oliff PLC

(57) ABSTRACT

A pivot assembly bearing includes a shaft, a sleeve provided coaxially with the shaft, and a pair of rolling bearings arranged to be separated from each other in an axial direction between the shaft and the sleeve. The sleeve includes a ventilation path configured to communicate a region surrounded by the shaft, the pair of rolling bearings, and the sleeve with the outside of the sleeve.

17 Claims, 15 Drawing Sheets

PIVOT ASSEMBLY BEARING AND HARD DISK DRIVE DEVICE

CROSS-REFERENCE TO RELATED APPLICATIONS

The present application claims priority to and incorporates by reference the entire contents of Japanese Patent Applications No. 2014-219565 and No. 2014-219566, both filed in Japan on Oct. 28, 2014.

BACKGROUND OF THE INVENTION

1. Field of the Invention

The present invention relates to a pivot assembly bearing and a hard disk drive device.

2. Description of the Related Art

A hard disk drive device is one of storage devices for computers. For example, in the hard disk drive device, a swing arm is supported by a pivot assembly bearing in a swingable manner. The pivot assembly bearing is configured such that a pair of rolling bearings is arranged between a shaft and a sleeve surrounding the shaft, and is fixed to a base plate with a screw.

In recent years, as an amount of recording data increases and a data reading/writing speed increases, it becomes increasingly important to maintain cleanliness inside the hard disk drive device. Examples of foreign matters generated in the hard disk drive device include particles due to a lubricant such as grease used for the rolling bearing of the pivot assembly bearing. The particles are minute amount of particles of oil in the lubricant discharged to the outside when a rolling element of the rolling bearing is rotated to stir the lubricant enclosed in the rolling bearing. When the particles float, the particles adhere to components of the hard disk drive device and exert an adverse effect on the hard disk drive device. To reduce the particles to be discharged, various pivot assembly bearings have been developed.

As such a pivot assembly bearing, for example, Japanese Laid-open Patent Publication No. 2013-48005 discloses a pivot assembly bearing (a pivot bearing unit for a hard disk actuator) having a shield cap with a stepped shape, the shield cap being arranged to face an outer ring of the rolling bearing constituting the pivot assembly bearing in an axial direction, in order to narrow a gap between the shield cap and the outer ring of the rolling bearing for reducing the amount of discharged particles.

Japanese Laid-open Patent Publication No. 1-277375 (the invention of a magnetic disc device) discloses a bearing structure for preventing diffusion of contaminants by providing a magnetic fluid seal containing a plurality of bearings between a shaft and an arm holder in a magnetic disc device including the arm holder rotatably held by the shaft via the bearings.

However, in the pivot assembly bearing disclosed in Japanese Laid-open Patent Publication No. 2013-48005, there is a large gap between the shield cap and a shielding member of the rolling bearing, so that a flow of air entering or exiting through the gap is generated when a strong air flow is caused inside the hard disk drive device due to rotation of the magnetic disc or a swing movement of the swing arm. In this case, the air flowed out from the inside of the pivot assembly bearing passes through a portion of the rolling bearing in which the lubricant is enclosed. Due to this, the lubricant in the rolling bearing may be discharged as particles along with the air that is flowed out. Thus, in terms of reducing the discharged particles, further improvement is required.

In the bearing structure disclosed in Japanese Laid-open Patent Publication No. 1-277375, an internal pressure is increased when the air inside the pivot assembly bearing is expanded due to heat caused by the operation of a motor or heat caused when the swing arm repeatedly swings for a long time, and a magnetic fluid of the magnetic fluid seal may be scattered.

SUMMARY OF THE INVENTION

It is an object of the present invention to solve at least part of the problems in the conventional technology.

A pivot assembly bearing according to one aspect of the preset invention may include a shaft, a sleeve provided coaxially with the shaft, and a pair of rolling bearings arranged to be separated from each other in an axial direction between the shaft and the sleeve, and the sleeve may include a ventilation path configured to communicate a region surrounded by the shaft, the pair of rolling bearings, and the sleeve with the outside of the sleeve.

A pivot assembly bearing according to another aspect of the present invention may include: a shaft; a sleeve provided coaxially with the shaft; a pair of rolling bearings arranged to be separated from each other in an axial direction between the shaft and the sleeve; and at least one magnetic fluid seal between the shaft and the sleeve, and the sleeve may include a ventilation path configured to communicate a region surrounded by the shaft, the pair of rolling bearings, and the sleeve with outside of the sleeve.

The above and other objects, features, advantages and technical and industrial significance of this invention will be better understood by reading the following detailed description of presently preferred embodiments of the invention, together with the accompanying drawings.

DETAILED DESCRIPTION OF THE PREFERRED EMBODIMENTS

The following describes a pivot assembly bearing and a hard disk drive device according to embodiments of the present invention with reference to the drawings.

Figure 1:
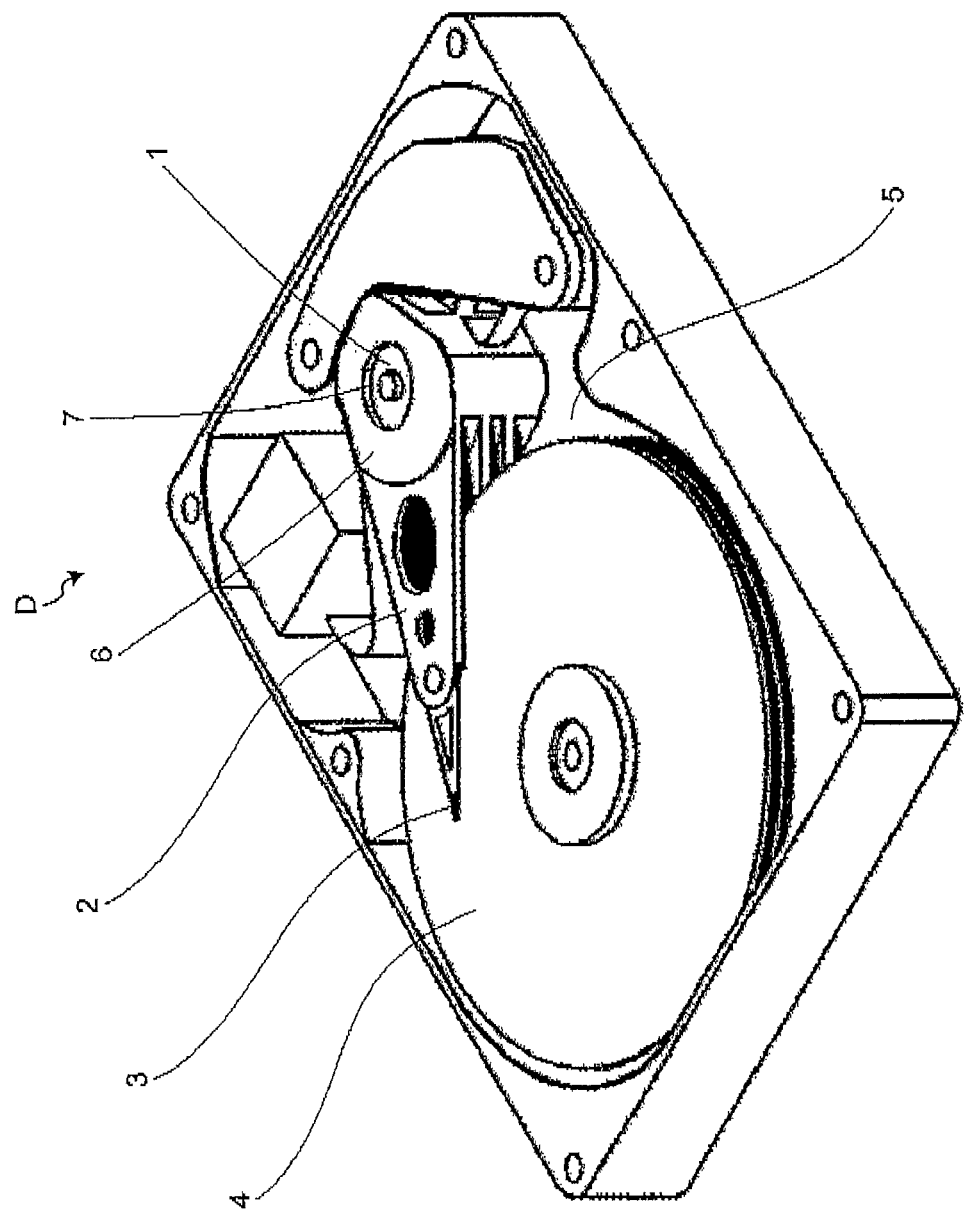
FIG. 1 is a perspective view of a hard disk drive device (HDD) including a pivot assembly bearing.

FIG. 1 is a perspective view of a hard disk drive device (HDD) including a pivot assembly bearing. In a hard disk drive device D illustrated in FIG. 1, a swing arm 2 is supported by a pivot assembly bearing 1 in a swingable manner. A magnetic head 3 at a distal end of the swing arm 2 moves on a magnetic disc 4 to record data in the magnetic disc 4 or read recorded data from the magnetic disc 4. The pivot assembly bearing 1 is configured such that a pair of rolling bearings is arranged between a shaft and a sleeve surrounding the shaft, and is fixed to a base plate 5 with a screw. As the pivot assembly bearing 1, pivot assembly bearings according to the embodiments described below can be used.

First Embodiment

Figure 2:
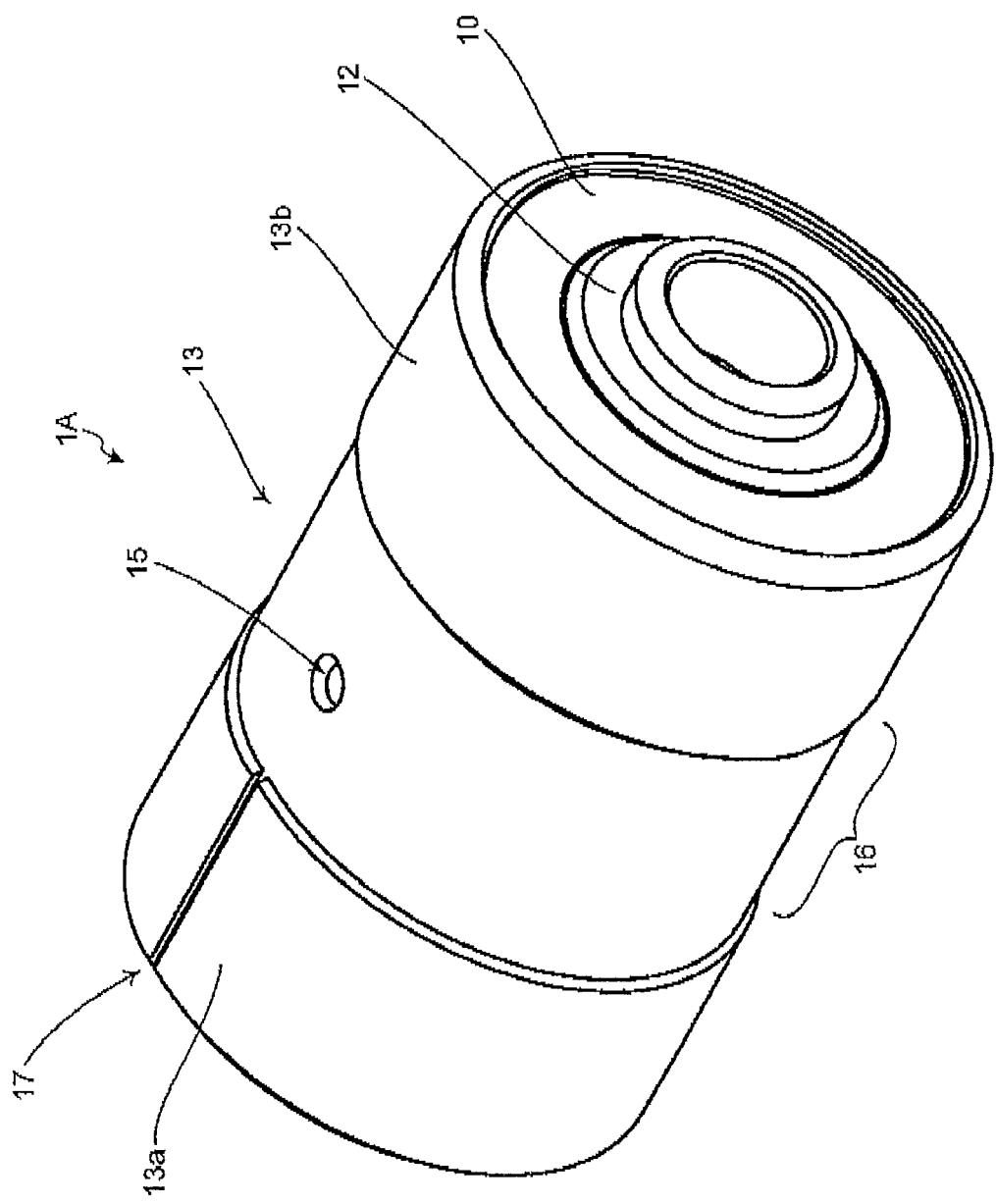
FIG. 2 is a perspective view of the pivot assembly bearing according to a first embodiment.

FIG. 2 is a perspective view of the pivot assembly bearing 1A according to a first embodiment of the present invention. The pivot assembly bearing 1A is fitted in a mounting hole 7 formed in a swing arm block 6 of the swing arm 2 illustrated in FIG. 1, and supports the swing arm 2 in a swingable manner.

Figure 3:
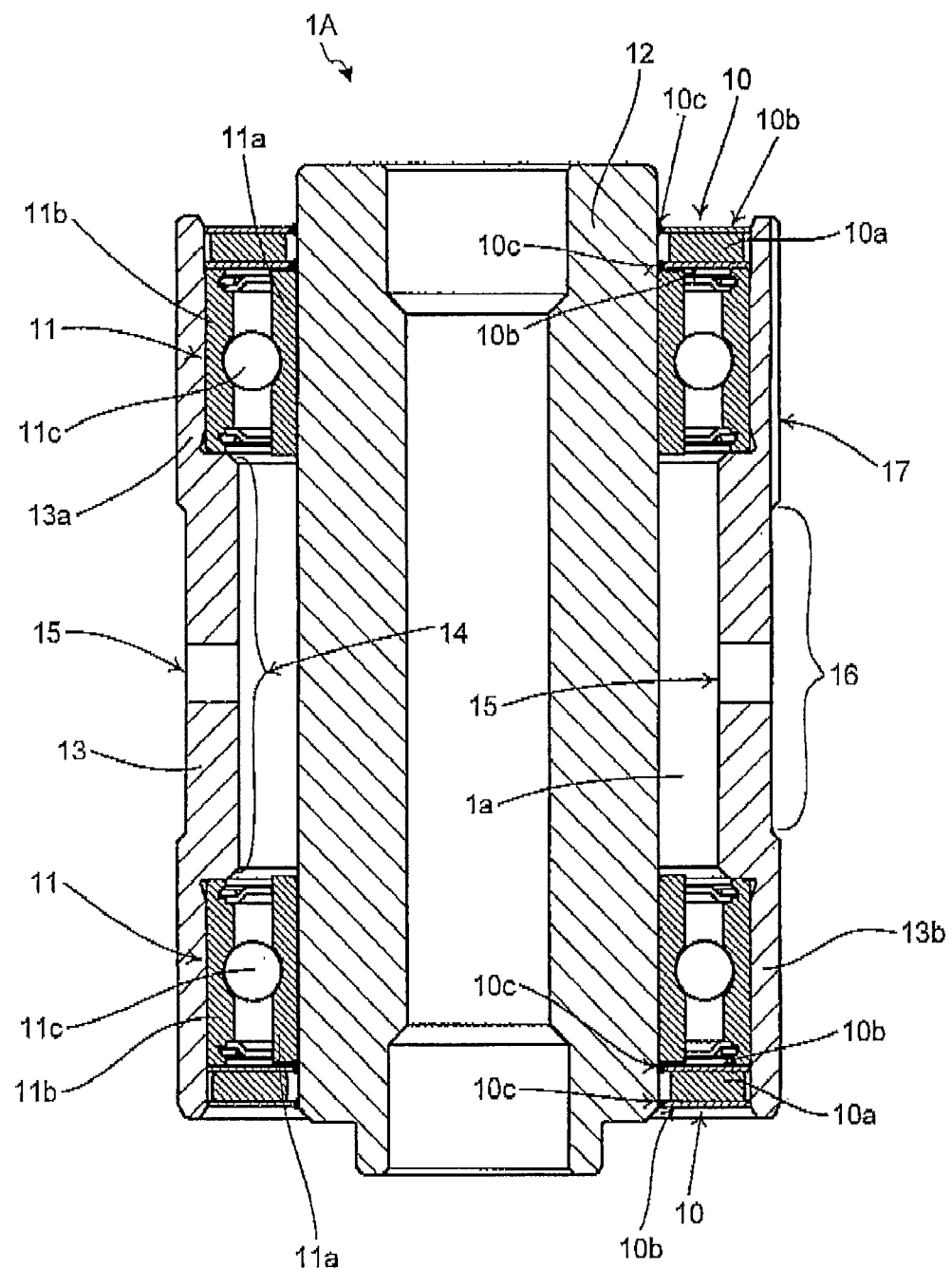
FIG. 3 is a cross-sectional view of the pivot assembly bearing according to the first embodiment.

FIG. 3 is a cross-sectional view of the pivot assembly bearing 1A according to the first embodiment of the present invention. The pivot assembly bearing 1A includes a pair of rolling bearings 11, and a shaft 12 and a sleeve 13 extending in an axial direction.

Each of the rolling bearings 11 includes a rolling element 11c held between an inner ring 11a and an outer ring 11b. The inner ring 11a is press-fitted or bonded to an outer peripheral surface of the shaft 12, and the outer ring 11b is press-fitted or bonded to an inner peripheral surface of the sleeve 13 that is a cylindrical body. A lubricant such as grease for lubrication or lubricating oil is enclosed between the inner ring 11a and the outer ring 11b.

The shaft 12 is made of a ferromagnetic steel material (hereinafter, referred to as magnetic steel) such as ferritic stainless steel to hold a magnetic fluid 10c of a magnetic fluid seal 10 described later by a magnetic force. As illustrated in FIG. 3, the shaft 12 is held relatively rotatable with respect to the sleeve 13 by the rolling bearings 11 arranged on an upper end side (upper side of the figure) and a lower end side (lower side of the figure) of the pivot assembly bearing 1A.

The sleeve 13 is a cylindrical body as described above. A preferred material for the sleeve 13 is magnetic steel (for example, ferritic stainless steel). That is, when the shaft 12 and the sleeve 13 are made of magnetic steel, the magnetic fluid seal 10 described later can form a magnetic circuit, so that a leakage flux can be reduced. Due to this, the rolling bearing 11 is hardly magnetized, so that it is possible to reduce a possibility that torque of the rolling bearing 11 is increased due to magnetization.

A spacer part 14 is arranged on the inner peripheral surface of the sleeve 13. End faces of outer rings 11b of the pair of rolling bearings 11 positioned on the upper end side and the lower end side of the pivot assembly bearing 1A abut on the spacer part 14. With the spacer part 14, the rolling bearings 11 on the upper end side and the lower end side are arranged being separated from each other in the axial direction.

Thus, the pivot assembly bearing 1A includes a cylindrical space 1a formed therein corresponding to a region surrounded by the spacer part 14 of the sleeve 13, the rolling bearing 11 on the upper end side, the rolling bearing 11 on the lower end side, and the shaft 12.

In the pivot assembly bearing 1A, magnetic fluid seals 10 are arranged on an upper part of the rolling bearing 11 on the upper end side and a lower part of the rolling bearing 11 on the lower end side. The magnetic fluid seal 10 includes an annular permanent magnet plate 10a, two parallel yokes 10b that are annular magnetic plates coaxially fixed to both end faces of the permanent magnet plate 10a (in FIG. 3, an upper surface and a lower surface), and the magnetic fluid 10c injected and held in a gap surrounded by the yokes 10b and the shaft 12.

The yokes 10b are fixed to the sleeve 13 by press-fitting or bonding to the inner peripheral surface of the sleeve 13. The magnetic fluid 10c is held between the yokes 10b and the shaft 12 by means of the magnetic force, and fills the gap between the yokes 10b and the shaft 12. That is, the magnetic fluid seal 10 blocks the gap between the shaft 12 and the sleeve 13. Due to this, the inside of the pivot assembly bearing 1A is hermetically sealed, which prevents particles from being discharged. The magnetic fluid seal 10 may be configured such that the yokes 10b are fixed to the outer peripheral surface of the shaft 12, and the magnetic fluid 10c is injected and held in the gap between the yokes 10b and the inner peripheral surface of the sleeve 13.

When the pivot assembly bearing 1A is fitted in the mounting hole 7 of the swing arm block 6 and the hard disk drive device is driven, the air inside the pivot assembly bearing 1A may be expanded due to heat caused by the operation of a motor or heat caused when the swing arm 2 repeatedly swings for a long time. Then, the internal pressure may increase and the magnetic fluid 10c of the magnetic fluid seal 10 may be scattered. Additionally, the magnetic fluid 10c of the magnetic fluid seal 10 may be scattered by a strong air flow caused inside the pivot assembly bearing 1A due to rotation of the magnetic disc or a swing movement of the swing arm 2. Accordingly, a method for discharging the expanded air and the air flow inside the pivot assembly bearing 1A is required.

In the pivot assembly bearing 1A according to the first embodiment, as illustrated in FIG. 2 and FIG. 3, a through hole 15 penetrating a peripheral wall of the sleeve 13 in a radial direction is formed in the spacer part 14. The through hole 15 should be formed at least at one location, but may be formed at two or more locations. In the illustrated example, the through hole 15 is formed perpendicularly (in the radial direction) to the outer peripheral surface of the sleeve 13, but it may be formed in a different direction. If the through hole 15 is excessively large, the particles are likely to be discharged from the through hole 15, which results in a opposite effect. Accordingly, the diameter of the through hole 15 is preferably equal to or smaller than 3 mm. In the embodiment in FIG. 3, through holes 15 each having a diameter of 2 mm are provided at two locations in the axially central part of the sleeve 13.

As illustrated in FIG. 2, an annular groove 16 is formed at the central portion of the outer peripheral surface of the sleeve 13 including the through hole 15. The outer peripheral surface of the sleeve 13 is divided into an upper end part 13a and a lower end part 13b by the annular groove 16. A flow path groove 17 extending in the axial direction is formed on the upper end part 13a of the outer peripheral surface of the sleeve 13. Alternatively, the flow path groove 17 may be formed on the lower end part 13b of the outer peripheral surface, or may be formed on both of the upper end part 13a and the lower end part 13b.

As described above, the sleeve 13 includes the through hole 15, the annular groove 16, and the flow path groove 17 formed thereon. Accordingly, when the pivot assembly bearing 1A is fitted in the mounting hole 7 of the swing arm block 6 (that is, when the pivot assembly bearing 1A is mounted on the swing arm 2), the cylindrical space 1a communicates with the outside of the pivot assembly bearing 1A through a ventilation path including the through hole 15, the annular groove 16, and the flow path groove 17.

Thus, even when the air inside the pivot assembly bearing 1A is expanded due to heat generated during the operation of the hard disk drive device, the expanded air is discharged from the cylindrical space 1a to the outside of the pivot assembly bearing 1A through the ventilation path including the through hole 15, the annular groove 16, and the flow path groove 17. This configuration can prevent the magnetic fluid of the magnetic fluid seal from being scattered due to the expansion of the air, and improve reliability of the hard disk drive device. In place of the annular groove 16, a recessed part including the through hole 15 may be provided.

In the pivot assembly bearing 1A according to the embodiment, the magnetic fluid seals are arranged at both ends thereof to hermetically seal the inside of the pivot assembly bearing 1A. This configuration can prevent the particles from being discharged, and prevent the loss of sealing function when the magnetic fluid of the magnetic fluid seal is scattered due to an increase in the internal pressure. The hard disk drive device including the pivot assembly bearing 1A according to the embodiment can prevent the scatter of the magnetic fluid in the magnetic fluid seal, so that the magnetic fluid itself does not become a contaminant, and quality and reliability of the hard disk drive device can be improved.

Subsequently, the following describes second to eighth embodiments of the present invention. Throughout the drawings referred to in these embodiments, the same components as that in the first embodiment are denoted by the same reference numeral, and the description thereof will not be repeated.

Second Embodiment

Figure 4:
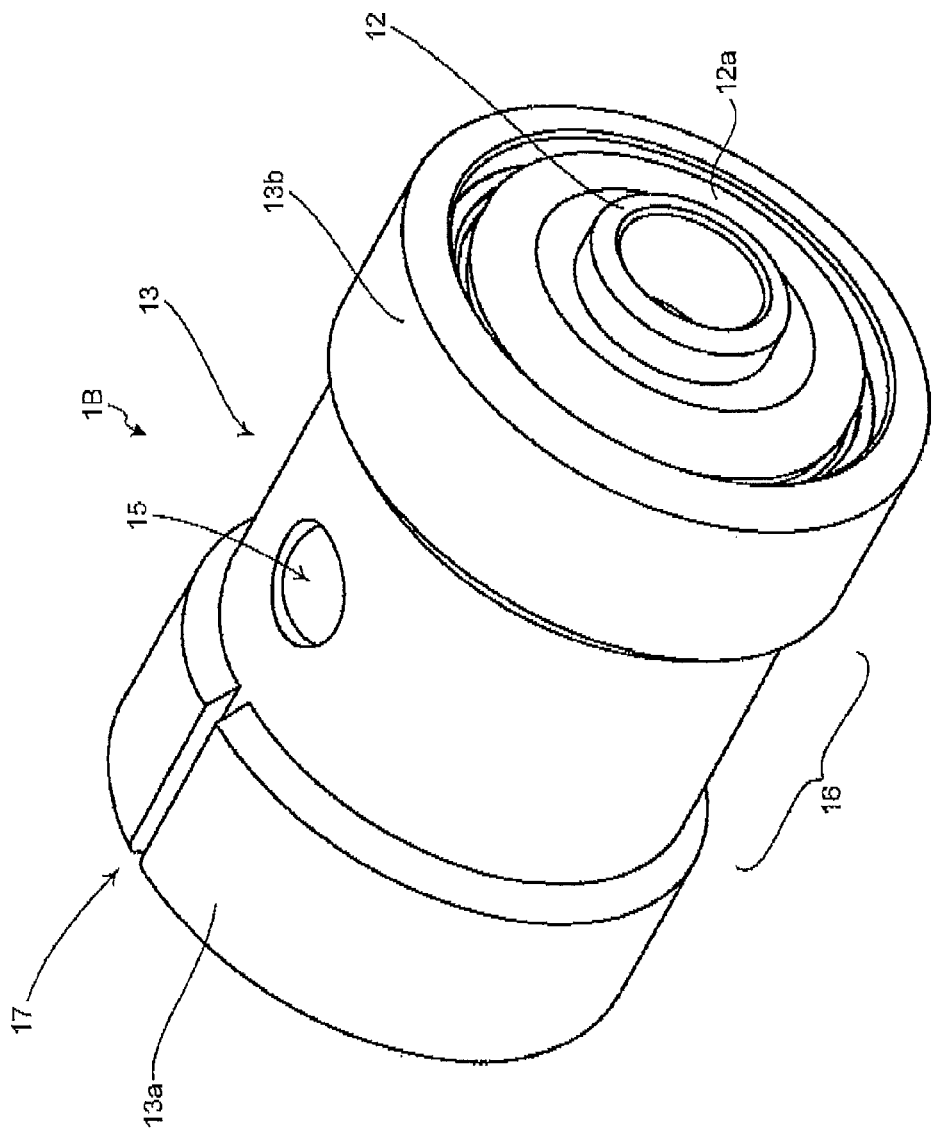
FIG. 4 is a perspective view of a pivot assembly bearing according to a second embodiment.

FIG. 4 is a perspective view of a pivot assembly bearing 1B according to a second embodiment of the present invention. The pivot assembly bearing 1B is fitted in the mounting hole 7 formed in the swing arm block 6 of the swing arm 2 illustrated in FIG. 1, and supports the swing arm 2 in a swingable manner.

Figure 5:
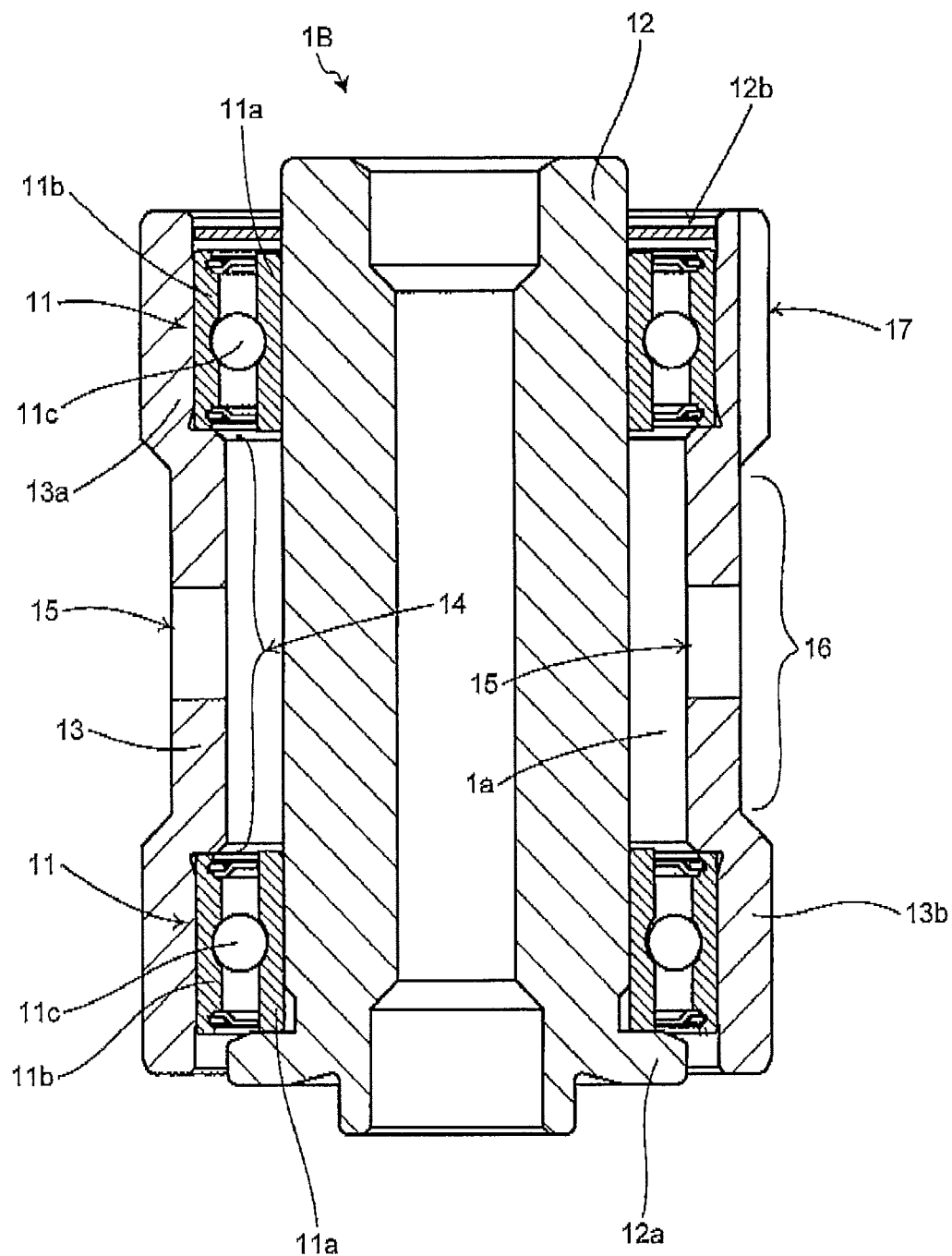
FIG. 5 is a cross-sectional view of the pivot assembly bearing according to the second embodiment.

FIG. 5 is a cross-sectional view of the pivot assembly bearing 1B according to the second embodiment of the present invention. The pivot assembly bearing 1B includes the pair of rolling bearings 11, and the shaft 12 and the sleeve 13 extending in the axial direction. In the configuration according to the second embodiment, a flange 12a is formed at one end of the shaft 12 and an annular sealing member is provided at the other end in place of the magnetic fluid seal in the first embodiment.

The rolling bearing 11 includes the rolling element 11c held between the inner ring 11a and the outer ring 11b. The inner ring 11a is press-fitted or bonded to the outer peripheral surface of the shaft 12, and the outer ring 11b is press-fitted or bonded to the inner peripheral surface of the sleeve 13. A lubricant such as grease for lubrication or lubricating oil is filled between the inner ring 11a and the outer ring 11b.

As illustrated in FIG. 5, the shaft 12 is held by the rolling bearings 11 arranged on the upper end side (upper side of the figure) and the lower end side (lower side of the figure) of the pivot assembly bearing 1 in a relatively rotatable manner with respect to the sleeve 13.

The lower end of the shaft 12 is fixed to the base plate 5 of the hard disk drive device D with a screw (not illustrated). The flange 12a having an outer diameter smaller than an inner diameter of the sleeve 13 is formed on the lower end side of the shaft 12. The flange 12a abuts on the end face of the inner ring 11a of the rolling bearing 11 on the lower end side to apply a pre-load.

An annular sealing member 12b is press-fitted or bonded to the upper end side of the shaft 12. The annular sealing member 12b does not contact the sleeve 13 and the outer ring 11b. Accordingly, the sleeve 13 can rotate without interfering with the annular sealing member 12b.

The spacer part 14 is arranged on the inner peripheral surface of the sleeve 13. The end faces of the outer rings 11b of the pair of rolling bearings 11 positioned on the upper end side and the lower end side of the pivot assembly bearing 1B abut on the spacer part 14. With the spacer part 14, the rolling bearings 11 on the upper end side and the lower end side are arranged being separated from each other in the axial direction. The pivot assembly bearing 1B includes the cylindrical space 1a formed therein corresponding to a region surrounded by the spacer part 14 of the sleeve 13, the rolling bearing 11 on the upper end side, the rolling bearing 11 on the lower end side, and the shaft 12. The through hole 15 penetrating the peripheral wall of the sleeve 13 in the radial direction is formed in the spacer part 14. The annular groove 16 is formed at the central portion of the outer peripheral surface of the sleeve 13 including the through hole 15. The outer peripheral surface of the sleeve 13 is divided into the upper end part 13a and the lower end part 13b by the annular groove 16. The flow path groove 17 extending in the axial direction is formed on the upper end part 13a of the outer peripheral surface of the sleeve 13. The sleeve 13 includes the through hole 15, the annular groove 16, and the flow path groove 17 formed thereon. Accordingly, when the pivot assembly bearing 1B is fitted in the mounting hole 7 of the swing arm block 6, the cylindrical space 1a is ventilated to the outside of the pivot assembly bearing 1B through the ventilation path including the through hole 15, the annular groove 16, and the flow path groove 17. A strong air flow may be caused due to rotation of the magnetic disc or a swing movement of the swing arm 2. In such a case, the air may enter through a gap between one of annular sealing members 12b and the sleeve 13. In the pivot assembly bearing in the related art, the air that has entered the pivot assembly bearing 1 flows out to the outside of the pivot assembly bearing through the gap between the other annular sealing member 12b and the sleeve 13. The air flowing out to the outside of the pivot assembly bearing passes through a portion of the rolling bearing 11 in which the lubricant is enclosed. Due to this, the lubricant in the rolling bearing 11 may be discharged as particles from the gap between the other annular sealing member 12b and the sleeve 13 together with the air flowing out to the outside of the pivot assembly bearing.

Additionally, the air inside the pivot assembly bearing may be expanded due to heat caused by rotation of the magnetic disc or a swing movement of the swing arm 2, the internal pressure may increase, the air may similarly pass through the portion of the rolling bearing 11 in which the lubricant is enclosed to flow out to the outside of the pivot assembly bearing, and the lubricant in the rolling bearing 11 may be discharged as particles.

According to the second embodiment, the cylindrical space 1a of the pivot assembly bearing 1B communicates with the outside of the pivot assembly bearing 1B through the ventilation path including the through hole 15, the annular groove 16, and the flow path groove 17. Therefore, the air inside the pivot assembly bearing flows out through the ventilation path. This configuration can reduce the amount of the air passing through the portion of the rolling bearing in which the lubricant is enclosed, and suppress the discharge of particles efficiently. The particles can be reduced with simple processing on the sleeve, so that an increase of production cost can be prevented. In place of the annular groove 16, a recessed part including the through hole 15 may be provided.

Third Embodiment

Figure 6:
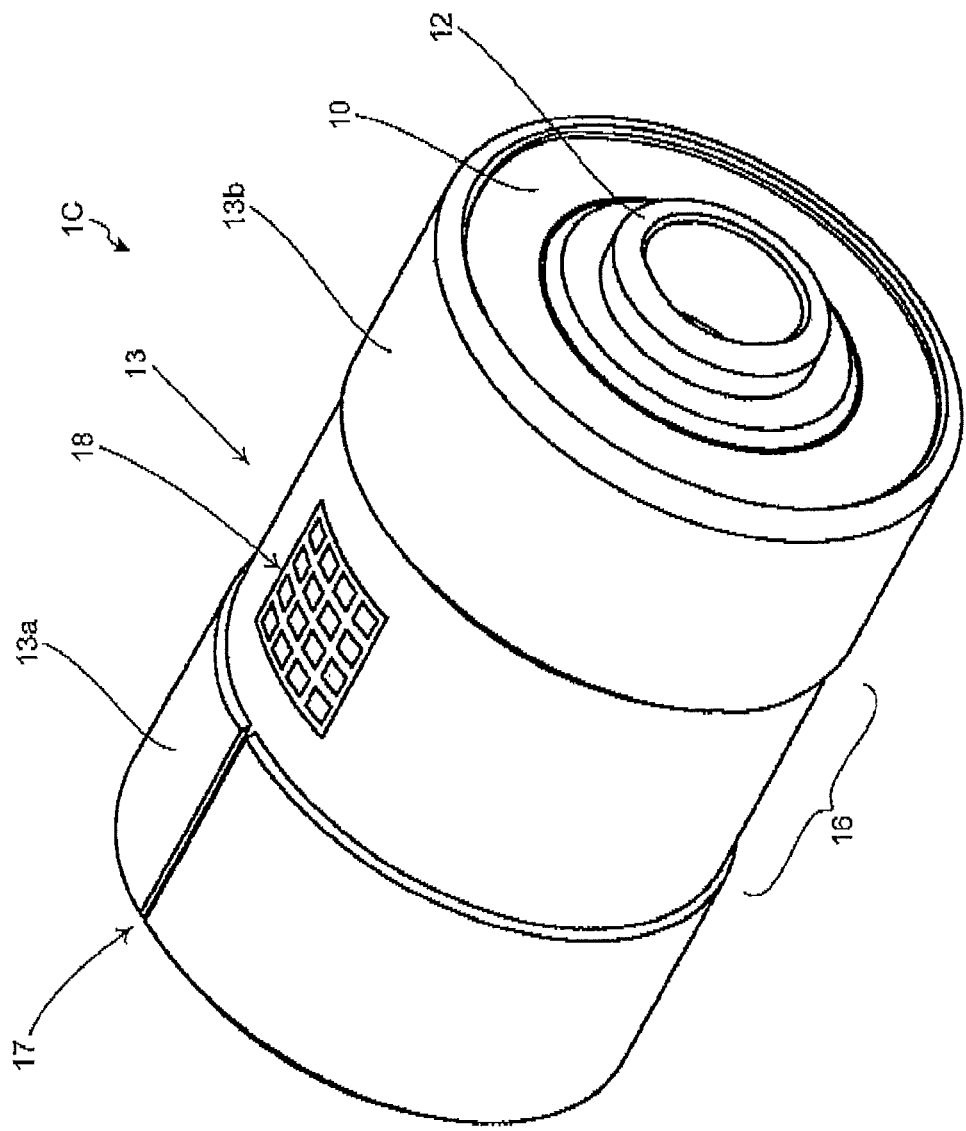
FIG. 6 is a perspective view of a pivot assembly bearing according to a third embodiment.
Figure 7:
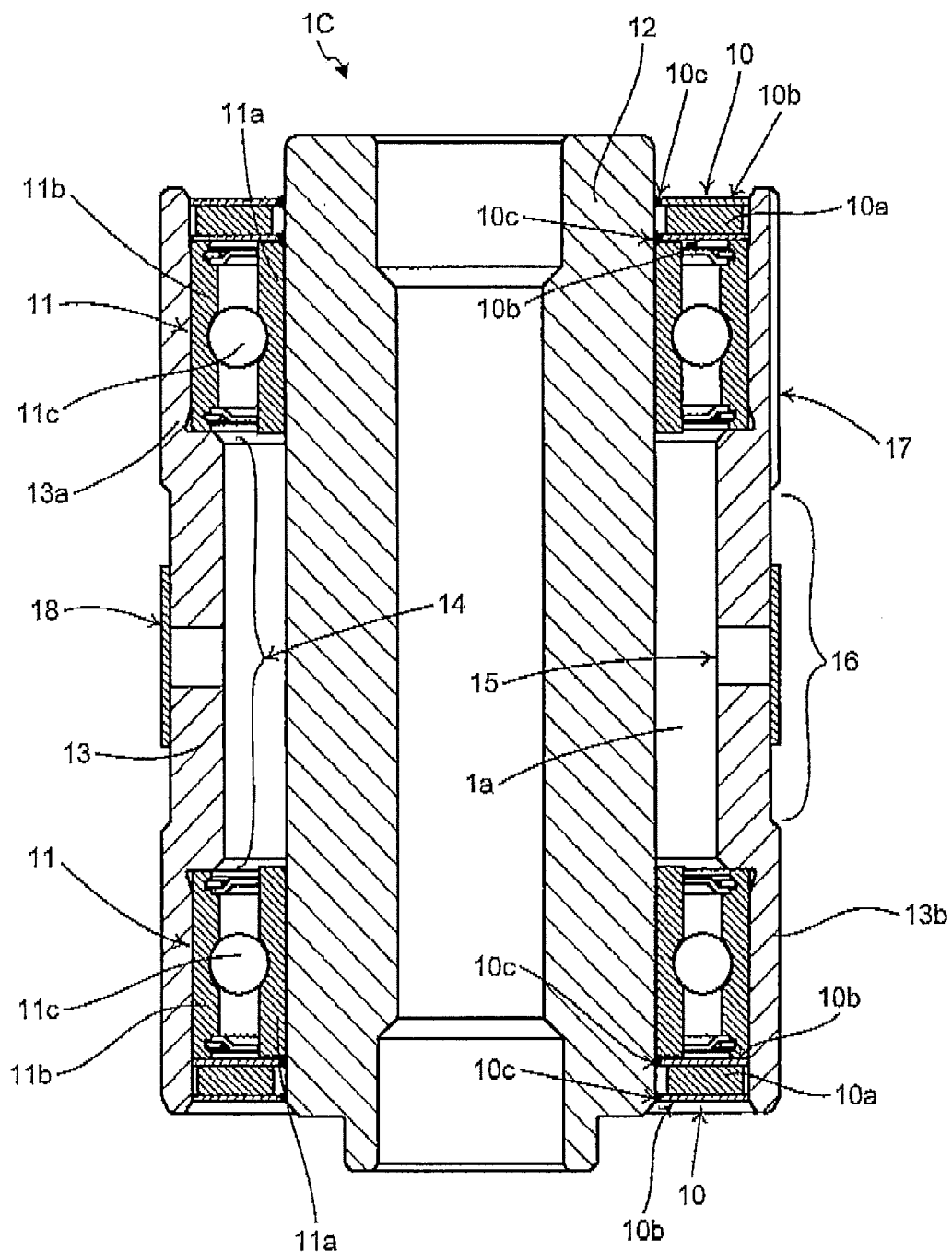
FIG. 7 is a cross-sectional view of the pivot assembly bearing according to the third embodiment.

In a pivot assembly bearing 1C according to a third embodiment, as illustrated in FIG. 6 and FIG. 7, a sheet-like filter 18 that closes the through hole 15 is attached to the surface of the annular groove 16.

The pivot assembly bearing 1C is fitted in the mounting hole 7 of the swing arm block 6. Accordingly, if the filter 18 is attached to the outer peripheral surface of the sleeve 13, the filter 18 may be peeled off when the pivot assembly bearing 1C is fitted in the mounting hole 7. To avoid this problem, a surface to attach the filter 18 preferably is recessed in a radially inner side in relation to the outer peripheral surface of the sleeve 13 which contacts the inner peripheral surface of the mounting hole 7. For example, an annular groove or a recessed part may be provided on the outer peripheral surface of the sleeve 13, and the filter 18 may be attached to the annular groove or the recessed part.

In the third embodiment, the filter 18 is attached to the annular groove 16 formed on the outer peripheral surface of the sleeve 13, which prevents the filter 18 from becoming an obstruction or being peeled off when the pivot assembly bearing 1C is inserted in the mounting hole 7. That is, the annular groove 16 not only plays a role of ventilating the cylindrical space 1a to the outside of the pivot assembly bearing 1C when the pivot assembly bearing 1C is fitted in the mounting hole 7, but also plays a role of allowing to insert the sleeve 13 with the filter 18 to the mounting hole 7 without hindrance (a role as a recessed part).

Alternatively, the sheet-like filter 18 may be attached to the inner peripheral surface of the sleeve 13. In this case, the filter 18 is not brought into contact with the inner peripheral surface of the mounting hole 7 when the pivot assembly bearing 1C is fitted in the mounting hole 7, so that the filter 18 does not become an obstacle to insert the pivot assembly bearing 1C, and also the filter 18 is not peeled off when the pivot assembly bearing 1C is inserted. Alternatively, the filter 18 may be attached to both of the outer peripheral surface and the inner peripheral surface of the sleeve 13.

In this way, when the through hole 15 is closed with the filter 18, the particles discharged from the cylindrical space 1a to the outside through the through hole 15 are adsorbed by the filter 18, so that the particles can be reduced more efficiently. The filter 18 can also reduce the amount of so-called outgas volatilized from the adhesive used in the pivot assembly bearing that exerts an adverse effect on the components of the hard disk drive device.

As the filter 18, for example, preferably used is a chemical filter that can remove gaseous contaminants in the air. The filter 18 may have an arbitrary shape so long as it can be attached to the annular groove 16 and close the through hole 15. For example, the shape of the filter 18 may be a circle having a larger-diameter than that of the through hole 15, or a square having sides longer than the diameter of the through hole 15.

Fourth Embodiment

Figure 8:
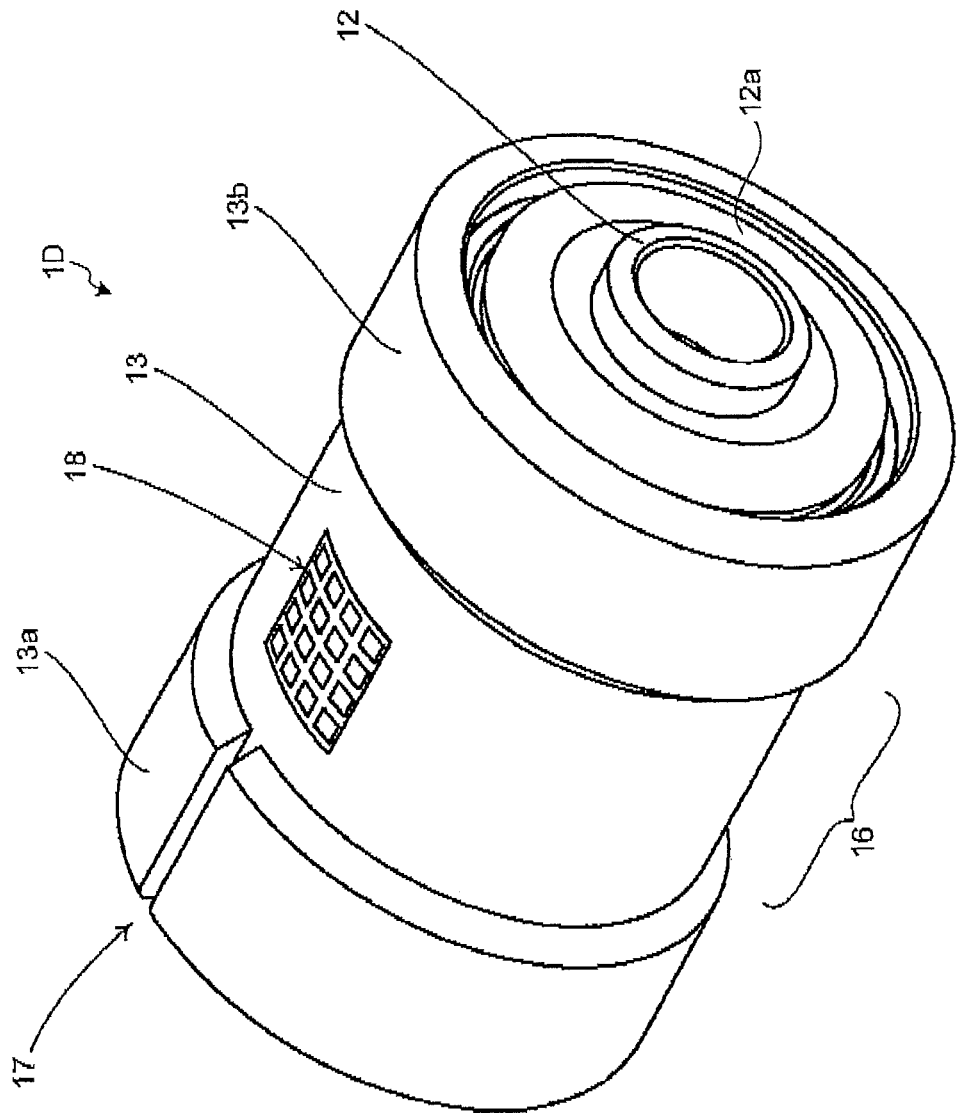
FIG. 8 is a perspective view of a pivot assembly bearing according to a fourth embodiment.
Figure 9:
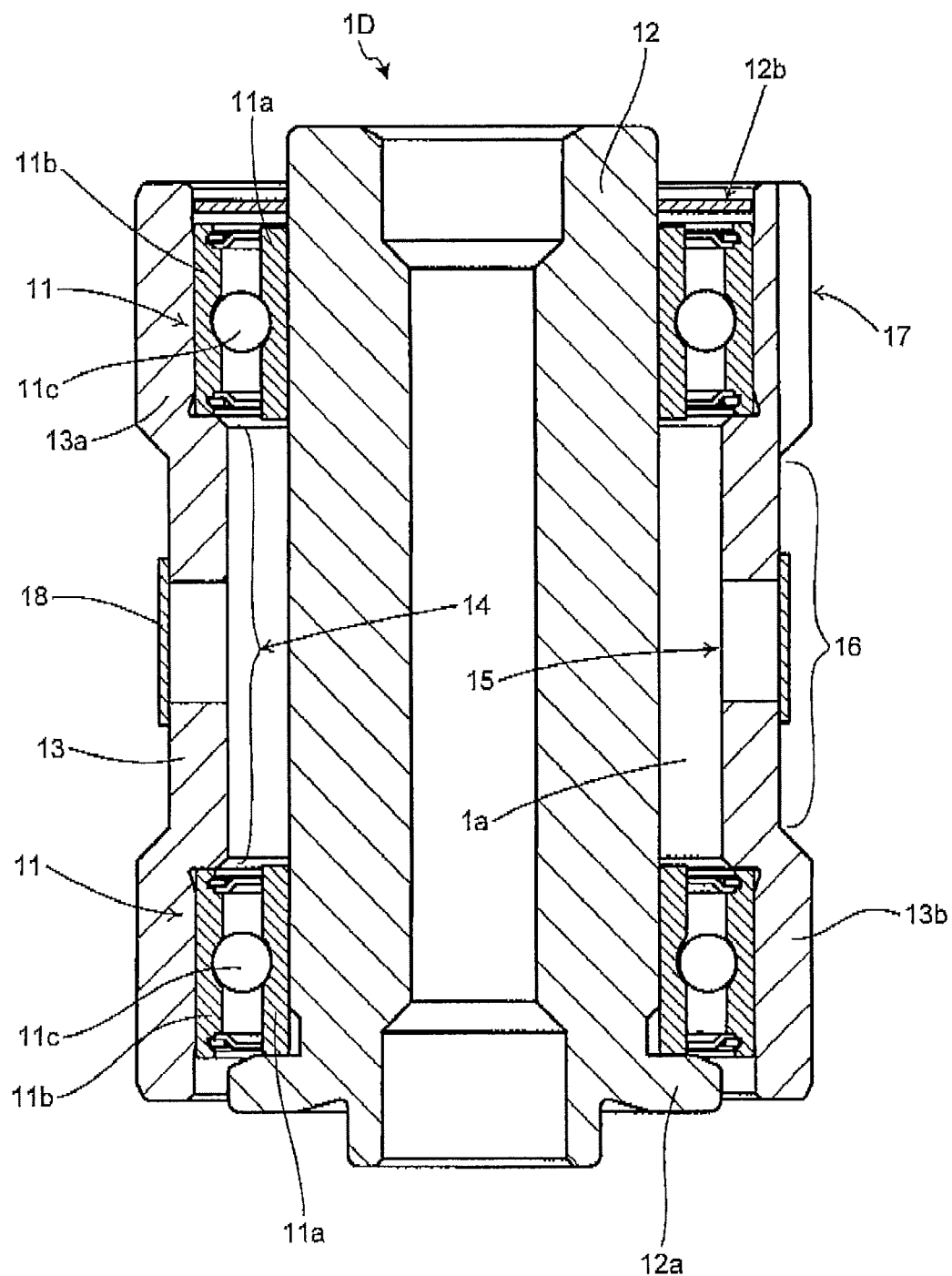
FIG. 9 is a cross-sectional view of the pivot assembly bearing according to the fourth embodiment.

In a pivot assembly bearing 1D according to a fourth embodiment, as illustrated in FIG. 8 and FIG. 9, the sheet-like filter 18 that closes the through hole 15 is attached to the surface of the annular groove 16. In the configuration according to the fourth embodiment, a flange is formed at one end of the shaft and an annular sealing member is provided at the other end in place of the magnetic fluid seal in the third embodiment.

In the fourth embodiment, similarly to the third embodiment, when the through hole 15 is closed with the filter 18, the particles discharged from the cylindrical space 1a to the outside through the through hole 15 are adsorbed by the filter 18, so that the particles to be discharged can be reduced more efficiently. The filter 18 can also reduce is the amount of so-called outgas volatilized from the adhesive used in the pivot assembly bearing that exerts an adverse effect on the components of the hard disk drive device.

Fifth Embodiment

Figure 10A:
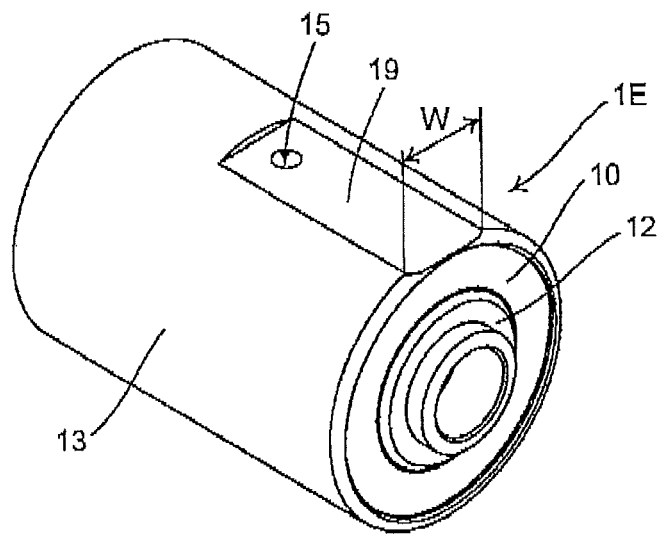
FIG. 10A is a perspective view of a pivot assembly bearing according to a fifth embodiment.

In a pivot assembly bearing 1E according to a fifth embodiment, as illustrated in FIG. 10A, a flat part 19 is formed between one end of the sleeve 13 (the lower end in the figure) and the through hole 15 by flattening a portion of the outer peripheral surface with so-called D-cut process in place of the annular groove 16 and the flow path groove 17 in the pivot assembly bearing 1E according to the first embodiment.

When the pivot assembly bearing 1E is fitted in the mounting hole 7, a communication path communicating with the outside is formed between the pivot assembly bearing 1E and the inner peripheral surface of the mounting hole 7 by the flat part 19. Through the communication path and the through hole 15, the cylindrical space 1a of the pivot assembly bearing 1E is ventilated to the outside of the pivot assembly bearing 1E. Thus, even when the air inside the pivot assembly bearing 1E is expanded due to heat caused by the motor or heat caused when the swing arm repeatedly swings for a long time, the expanded air is discharged from the cylindrical space 1a to the outside of the pivot assembly bearing 1E through the ventilation path including the through hole 15 and the communication path formed with the flat part 19. Accordingly, the magnetic fluid of the magnetic fluid seal can be prevented from being scattered due to the expansion of the air. The flat part 19 can be processed more easily than the annular groove 16 and the flow path groove 17 in the first embodiment. Accordingly, the processing time can be shortened.

Figure 10B:
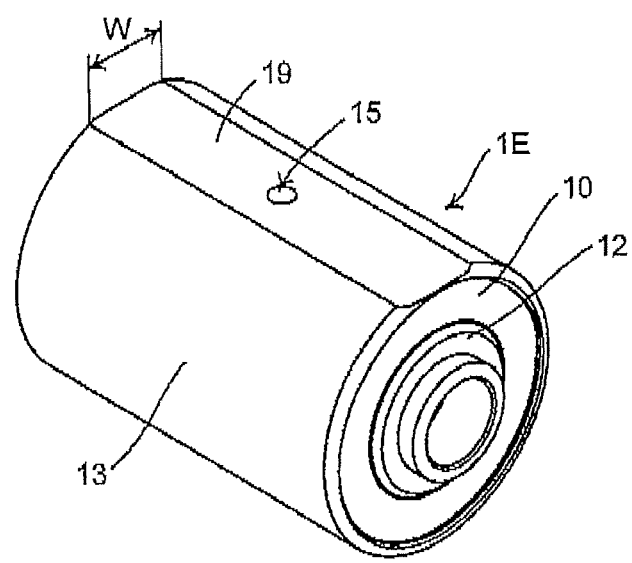
FIG. 10B is a perspective view of the pivot assembly bearing according to the fifth embodiment.

The flat part 19 is provided to form a gap between the outer peripheral surface of the sleeve 13 and the inner peripheral surface of the mounting hole 7 to communicate the through hole 15 with the outside. Accordingly, instead of performing D-cut process from the lower end of the sleeve 13 to the through hole 15 as the flat part 19 illustrated in FIG. 10A, the flat part 19 may be formed by flattening a portion of the outer peripheral surface extending from the upper end of the sleeve 13 to the through hole 15 with D-cut process. Alternatively, as illustrated in FIG. 10B, the flat part 19 may be formed by flattening a portion of the outer peripheral surface across the entire length of the sleeve from the upper end to the lower end of the sleeve 13 with D-cut process.

The size of width W of the flat part 19 is not limited so long as the strength of the sleeve 13 is not affected by D-cut process. The filter 18 that closes the through hole 15 may be attached to the surface of the flat part 19, to the inner peripheral surface of the sleeve 13, or to both of them.

Sixth Embodiment

In the configuration according to a sixth embodiment, a flange is formed at one end of the shaft and an annular sealing-member is provided at the other end in place of the magnetic fluid seal in the fifth embodiment. In a pivot assembly bearing 1F according to the sixth embodiment, as illustrated in FIG. 11A, the flat part 19 is formed by D-cut process flattening a portion of the outer peripheral surface extending from one end of the sleeve 13 (the lower end in the figure) to the through hole 15, in place of the annular groove 16 and the flow path groove 17 in the pivot assembly bearing 1F according to the second embodiment.

Thus, in the sixth embodiment, similarly to the fifth embodiment, the air inside the pivot assembly bearing flows out through the ventilation path including the communication path formed by the through hole 15 and the flat part 19. This configuration can reduce the amount of air passing through the portion of the rolling bearing in which the lubricant is enclosed, and suppress the discharge of the particles efficiently. The flat part 19 can be processed more easily than the annular groove 16 and the flow path groove 17 in the second embodiment. Accordingly, the processing time can be shortened.

Figure 11A:
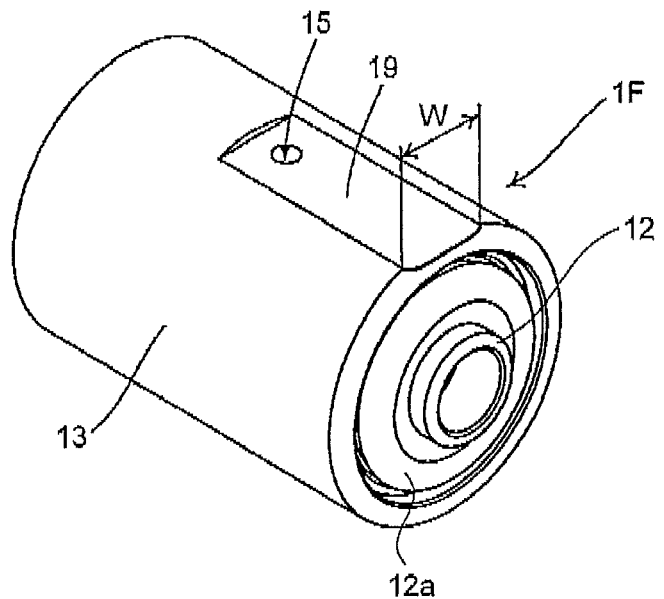
FIG. 11A is a perspective view of a pivot assembly bearing according to a sixth embodiment.
Figure 11B:
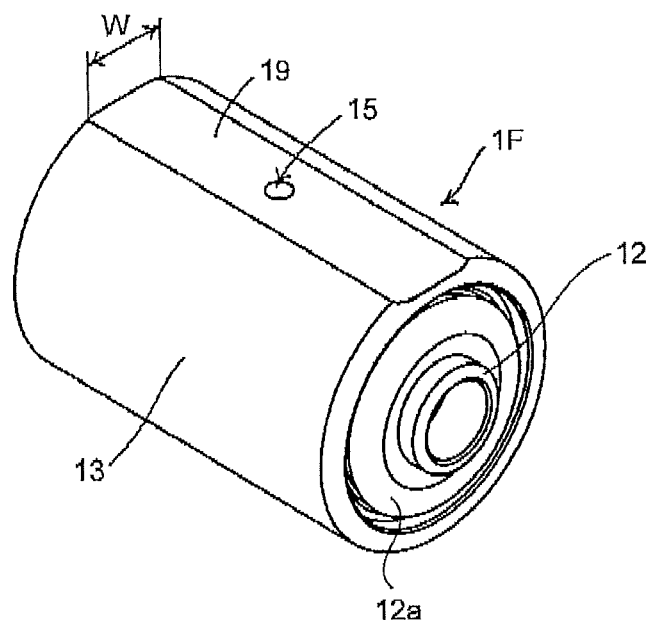
FIG. 11B is a perspective view of the pivot assembly bearing according to the sixth embodiment.

In the sixth embodiment, similarly to the fifth embodiment, instead of performing D-cut process on the outer peripheral surface from the lower end of the sleeve 13 to the through hole 15 as illustrated as the flat part 19 in FIG. 11A, the flat part 19 may be formed by D-cut process flattening a portion of the outer peripheral surface from the upper end of the sleeve 13 to the through hole 15. Alternatively, as illustrated in FIG. 11B, the flat part 19 may be formed by flattening a portion of the outer peripheral surface across the entire length of the sleeve from the upper end to the lower end of the sleeve 13.

Seventh Embodiment

Figure 12:
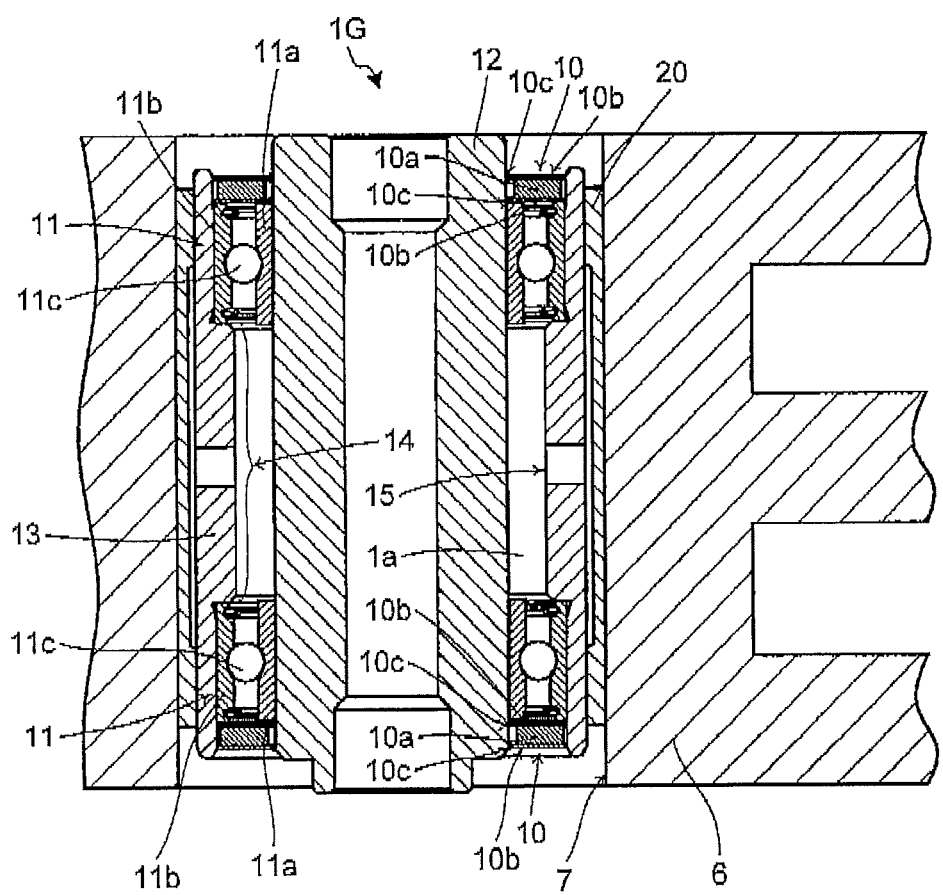
FIG. 12 is a cross-sectional view of a pivot assembly bearing according to a seventh embodiment.

Unlike the pivot assembly bearing 1A according to the first embodiment, in a pivot assembly bearing 1G according to a seventh embodiment, the annular groove 16 and the flow path groove 17 are not formed on the sleeve 13, and only the through hole 15 is formed thereon. As illustrated in FIG. 12, the pivot assembly bearing 1G according to the seventh embodiment is fitted in the mounting hole 7 via a tolerance ring 20 described later (that is, the pivot assembly bearing 1G is mounted on the swing arm 2 via the tolerance ring 20).

The tolerance ring 20 is a member interposed between two members, that is, the sleeve 13 of the pivot assembly bearing 1G and the swing arm block 6 of the swing arm 2, for positioning and fixing these members to each other. The tolerance ring has an annular shape and is made by an elastic material, for example.

An outer circumference of the tolerance ring 20 is formed to be corrugated at regular intervals along a circumferential direction. Due to this, when the pivot assembly bearing 1G according to the seventh embodiment is fitted in the mounting hole 7 via the tolerance ring 20, a gap is formed between the sleeve 13 and the mounting hole 7 with the tolerance ring 20 even when the annular groove 16 or the flow path groove 17 is not present on the outer peripheral surface of the sleeve 13.

Thus, even when the air inside the pivot assembly bearing 1G is expanded due to heat caused by the operation of the motor or heat caused when the swing arm repeatedly swings for a long time, the expanded air is discharged from the cylindrical space 1a to the outside of the pivot assembly bearing 1G through the through hole 15 and the gap formed by the tolerance ring 20 between the sleeve 13 and the mounting hole 7. Thus, when the tolerance ring is used, a flat part or a groove is not necessarily provided to the outer peripheral surface of the sleeve.

The filter 18 that closes the through hole 15 may be attached to the outer peripheral surface of the sleeve 13, the inner peripheral surface thereof, or both of them in the pivot assembly bearing 1G according to the seventh embodiment. However, when the pivot assembly bearing 1G according to the seventh embodiment is fitted in the mounting hole 7 via the tolerance ring 20, the outer peripheral surface of the sleeve 13 is rubbed against the tolerance ring 20, so that it is preferable to attach the filter 18 to the inner peripheral surface of the sleeve 13.

Obviously, also the pivot assembly bearing 1G according to any of the first embodiment to the sixth embodiment may be fitted in the mounting hole 7 via the tolerance ring 20.

Eighth Embodiment

Figure 13:
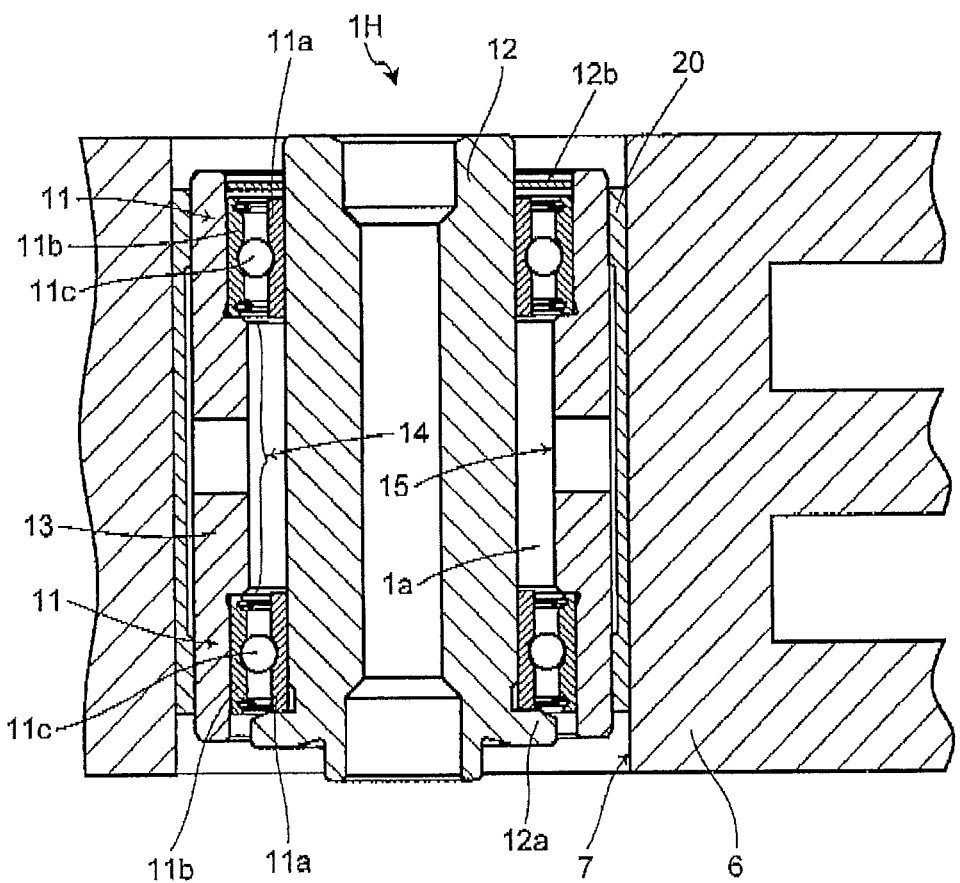
FIG. 13 is a cross-sectional view of a pivot assembly bearing according to an eighth embodiment.

In the configuration according to an eighth embodiment, a flange is formed at one end of the shaft and an annular sealing member is provided at the other end in place of the magnetic fluid seal in the seventh embodiment. Unlike the pivot assembly bearing 1B according to the second embodiment, in a pivot assembly bearing 1H according to the eighth embodiment, the annular groove 16 and the flow path groove 17 are not formed on the sleeve 13, and only the through hole 15 is formed thereon. As illustrated in FIG. 13, the pivot assembly bearing 1H according to the eighth embodiment is fitted in the mounting hole 7 via the tolerance ring 20 (that is, the pivot assembly bearing 1H is mounted on the swing arm 2 via the tolerance ring 20).

In the eighth embodiment, similarly to the seventh embodiment, the air inside the pivot assembly bearing flows out through the through hole 15 and the gap formed by the tolerance ring 20 between the sleeve 13 and the mounting hole 7. Thus, when the tolerance ring is used, a flat part or a groove is not necessarily provided to the outer peripheral surface of the sleeve.

The first to eighth embodiments of the present invention have been described above. However, a specific configuration is not limited thereto, and includes any design change and the like that does not depart from the scope of the invention. For example, in the first embodiment, the third embodiment, the fifth embodiment and the seventh embodiment, the magnetic fluid seals are arranged on the upper side of the rolling bearing 11 on the upper end side and the lower side of the rolling bearing 11 on the lower end side. However, it is sufficient that at least one magnetic fluid seal is arranged between the shaft 12 and the sleeve 13.

In the fifth embodiment and the sixth embodiment, exemplified is a case in which the cylindrical space 1a of the pivot assembly bearing 1E, 1F fitted in the mounting hole 7 is ventilated to the outside of the pivot assembly bearing 1E, 1F through the through-hole 15 and the flat part 19 formed on the sleeve 13, but this is merely an example. For example, in place of the flat part 19, a ventilation groove may be formed between the upper end of the outer peripheral surface of the sleeve 13 and the through hole 15. In this case, the cylindrical space 1a of the pivot assembly bearing 1E, 1F fitted in the mounting hole 7 is ventilated to the outside of the pivot assembly bearing 1E, 1F through the ventilation path including the through hole 15 and the communication path formed by the ventilation groove.

Accordingly, even when the air inside the pivot assembly bearing 1E, 1F is expanded due to heat caused by the operation of the motor or heat caused when the swing arm repeatedly swings for a long time, the expanded air is discharged from the cylindrical space 1a to the outside of the pivot assembly bearing 1E, 1F through the ventilation path including the through hole 15 and the ventilation groove. Thus, in the embodiment using the magnetic fluid seal, the magnetic fluid of the magnetic fluid seal can be prevented from being scattered due to the expansion of the air. In the embodiment using the annular sealing member, the amount of air passing through the portion of the rolling bearing in which the lubricant is enclosed can be reduced, and the discharge of the particles can be efficiently suppressed.

In the seventh embodiment and the eighth embodiment, exemplified is a case in which the cylindrical space 1a of the pivot assembly bearing 1G, 1H is ventilated to the outside through the ventilation path formed by the through hole 15 and the gap formed by the tolerance ring 20 between the sleeve 13 and the mounting hole 7 of the swing arm block 6. However, this is merely an example.

For example, a through hole penetrating the swing arm block 6 may be formed on the inner peripheral surface of the mounting hole 7 of the swing arm block 6, and the through hole may communicate with the through hole 15 of the sleeve 13. Alternatively, a vertical groove in the axial direction penetrating the end face of the swing arm block 6 may be formed on the inner peripheral surface of the mounting hole 7, and the vertical groove may communicate with the through hole 15 of the sleeve 13. In this case, the cylindrical space 1a can communicate with the outside of the pivot assembly bearing 1G, 1H through a ventilation path corresponding to the through hole 15 and the through hole or the vertical groove formed in the swing arm block 6. Accordingly, the air inside the pivot assembly bearing flows out through the ventilation path of the sleeve 13 formed by the through hole 15 and the through hole or the vertical groove of the swing arm block 6.

Thus, even when the air inside the pivot assembly bearing 1G, 1H is expanded due to heat caused by the operation of the motor or heat caused when the swing arm repeatedly swings for a long time, the expanded air is discharged from the cylindrical space 1a to the outside of the pivot assembly bearing 1G, 1H through the through hole 15 and the through hole or the vertical groove of the swing arm block 6. Accordingly, in the embodiment using the magnetic fluid seal, the magnetic fluid of the magnetic fluid seal can be prevented from being scattered due to the expansion of the air. In the embodiment using the annular sealing member, the amount of air passing through the portion of the rolling bearing in which the lubricant is enclosed can be reduced, and the discharge of particles can be efficiently suppressed.

In the pivot assembly bearing 1A to 1H according to any of the first to eighth embodiment, exemplified is a case in which the through hole 15 penetrating the peripheral wall of the sleeve 13 is formed in the spacer part 14 of the sleeve 13 as the ventilation path, but this is merely an example. The ventilation path is not limited to the through hole 15 so long as the cylindrical space 1a of the pivot assembly bearing 1A to 1H communicates with the outside of the pivot assembly bearing 1A to 1H.

Figure 14:
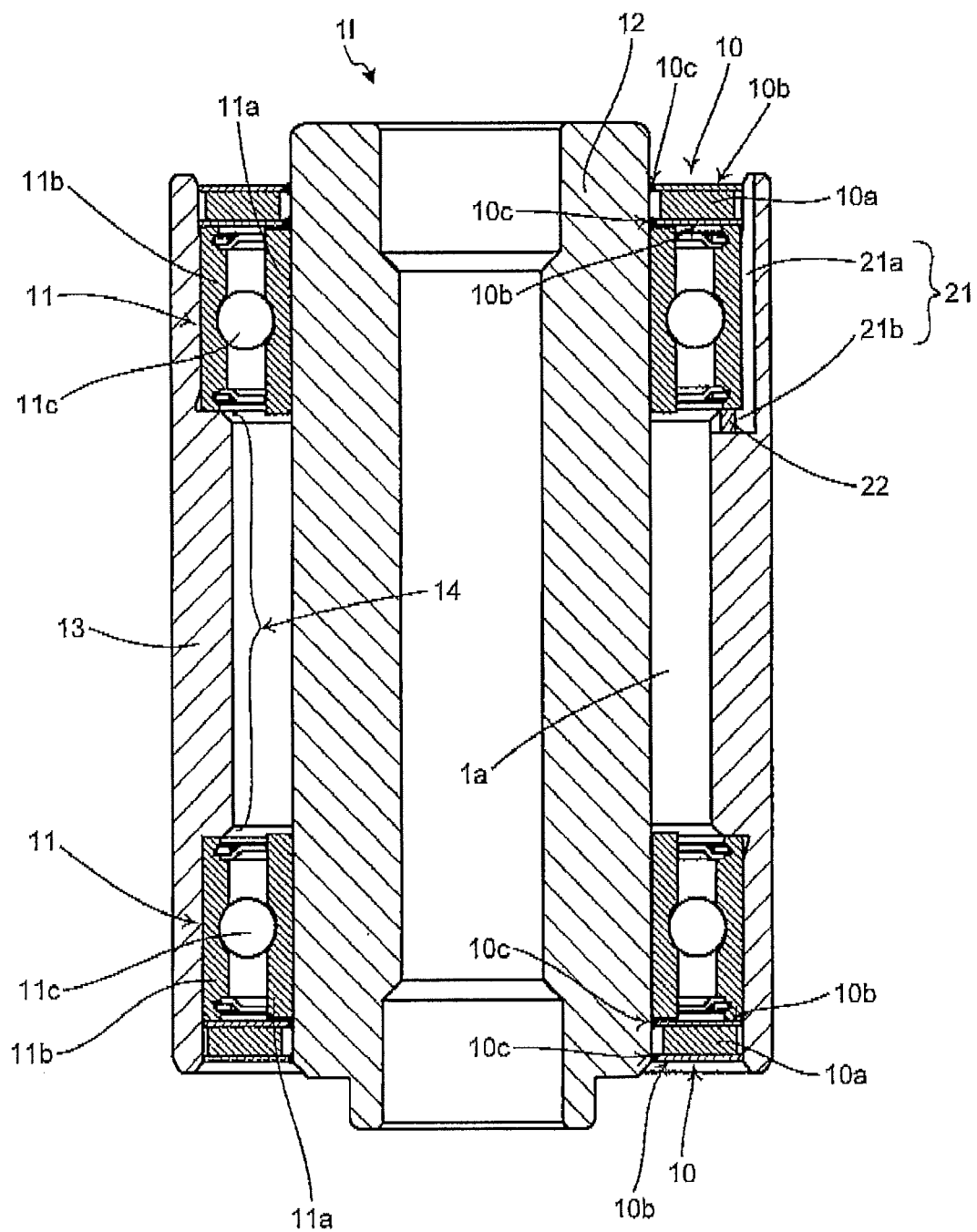
FIG. 14 is a cross-sectional view of a pivot assembly bearing according to a modification.
Figure 15:
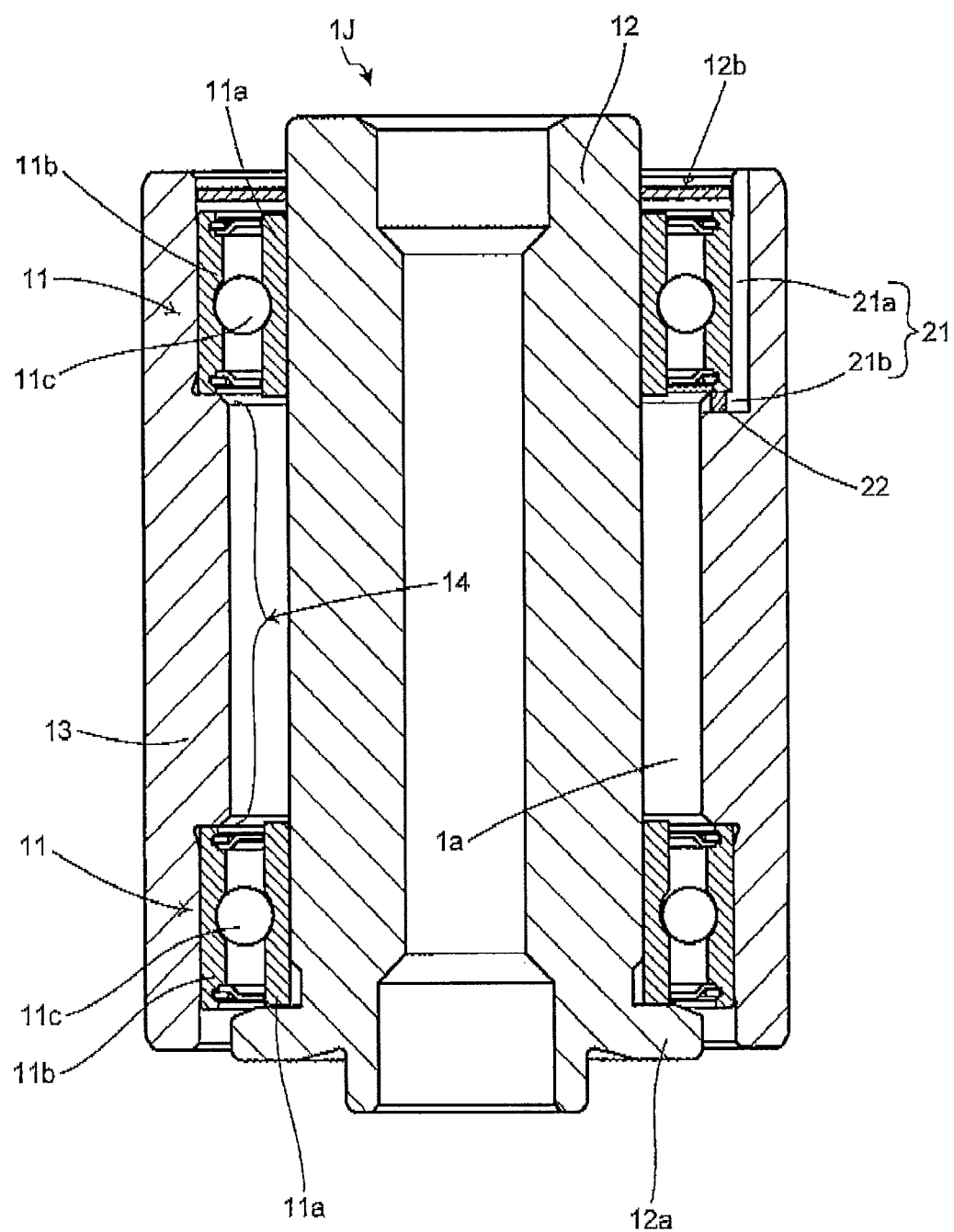
FIG. 15 is a cross-sectional view of the pivot assembly bearing according to another modification.

For example, as illustrated in FIG. 14 and FIG. 15, a ventilation groove 21 serving as the ventilation path may be formed at a portion of the inner peripheral surface of the sleeve 13 being in contact with the outer ring 11b of the rolling bearing 11. With such a configuration, the ventilation path that does not pass through the inside of the rolling bearing 11 can be formed, so that an air flow that passes through the inside of the rolling bearing 11 and discharges the particles to the outside can be suppressed. The ventilation groove 21 includes a vertical groove 21a and a horizontal groove 21b. The vertical groove 21a is formed between an upper end surface of the sleeve 13 and an upper end surface of the spacer part 14 on the inner peripheral surface of the sleeve 13 with which the outer peripheral surface of the outer ring 11b is in contact. The horizontal groove 21b is formed in a radial direction on the upper end surface of the spacer part 14 on which the end face of the outer ring 11b abuts. The vertical groove 21a is connected to the horizontal groove 21b. Accordingly, the cylindrical space 1a is ventilated to the outside of a pivot assembly bearing 1I, 1J through the ventilation groove 21 including the vertical groove 21a and the horizontal groove 21b.

Thus, even when the air inside the pivot assembly bearing 1I, 1J is expanded due to heat caused by the operation of the motor or heat caused when the swing arm repeatedly swings for a long time, the expanded air is discharged from the cylindrical space 1a to the outside of the pivot assembly bearing 1I, 1J through the ventilation groove 21 without passing through the inside of the rolling bearing 11. Accordingly, in the embodiment using the magnetic fluid seal, the particles can be prevented from being discharged to the outside, and the magnetic fluid of the magnetic fluid-seal can be prevented from being scattered due to the expansion of the air. In the embodiment using the annular sealing member, the amount of air passing through the portion of the rolling bearing in which the lubricant is enclosed can be reduced, and the discharge of the particles can be efficiently suppressed.

The ventilation groove 21 is formed on at least one portion of the sleeve 13. The ventilation groove 21 exemplified in FIG. 14 and FIG. 15 is formed on a portion of the sleeve 13 being in contact with the rolling bearing 11 that is arranged on the upper end side (upper side of the figure) of the pivot assembly bearing 1I, 1J, but this is merely an example. For example, the ventilation groove 21 may be formed on a portion of the sleeve 13 being in contact with the rolling bearing 11 that is arranged on the lower end side (lower side of the figure) of the pivot assembly bearing 1I, 1J.

As illustrated in FIG. 14 and FIG. 15, a sponge-like filter 22 may be arranged at one end of the ventilation groove 21. When the filter 22 is provided to the ventilation groove 21, the filter 22 adsorbs the particles discharged from the cylindrical space 1a to the outside through the ventilation groove 21, and the discharge of the particles can be suppressed more efficiently.

According to the first embodiment, the third embodiment, the fifth embodiment and the seventh embodiment, the magnetic fluid seal 10 is provided to both of the upper side and the lower side of the pivot assembly bearing 1A, 1C, 1E, 1G, but this is merely an example. For example, a flange may be formed on the lower end side of the shaft 12, and the magnetic fluid seal 10 may be provided only to the upper side. Alternatively, a shield cap may be provided to the upper end side of the shaft 12, and the magnetic fluid seal 10 may be provided only to the lower side.

According to the second embodiment, the fourth embodiment, the sixth embodiment, and the eighth embodiment, the flange 12a is formed on the lower end side of the shaft 12 of the pivot assembly bearing 1B, 1D, 1F, 1H, but this is merely an example. For example, the flange 12a is not necessarily formed on the shaft 12.

According to the second embodiment, the fourth embodiment, the sixth embodiment, and the eighth embodiment, the annular sealing member 12b is fixed to the upper end side of the shaft 12 of the pivot assembly bearing 1B, 1D, 1F, 1H, but this is merely an example. For example, the pivot assembly bearing does not necessarily include the annular sealing member 12b.

In the pivot assembly bearing 1B, 1D, 1F, 1H according to the second embodiment, the fourth embodiment, the sixth embodiment, and the eighth embodiment, the flange 12a having a large diameter and a stepped shape may be formed on the shaft 12, the flange 12a may be caused to be opposed to the end face of the outer ring 11b of the rolling bearing 11, and a gap between the flange 12a and the inner peripheral surface of the sleeve 13 may be formed to be narrow.

Cleanliness can be maintained in the hard disk drive device D in which the pivot assembly bearing 1A to 1H according to any of the first to eighth or other embodiments is fitted in the mounting hole 7 of the swing arm block 6 to support the swing arm 2 in a swingable manner. Accordingly, reliability of the hard disk drive device can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pivot assembly bearing comprising:
    a shaft;
    a sleeve provided coaxially with the shaft; and
    a pair of rolling bearings arranged to be separated from each other in an axial direction between the shaft and the sleeve, wherein
    the sleeve includes a ventilation path configured to communicate a region surrounded by the shaft, the pair of rolling bearings and the sleeve with outside of the sleeve,
    the ventilation path includes at least one through hole provided in a peripheral wall of the sleeve, and
    a communication path configured to communicate at least one end of the sleeve with the through hole is provided at an outer peripheral surface of the sleeve.

2. The pivot assembly bearing according to claim 1, wherein the communication path is a communication groove or a flat part formed on the outer peripheral surface of the sleeve.

3. The pivot assembly bearing according to claim 1, wherein the communication path is configured to communicate at least one end of the sleeve with an annular groove or a recessed part that is formed on the outer peripheral surface of the sleeve and communicates with the through hole.

4. The pivot assembly bearing according to claim 1, wherein a flange is formed at one end of the shaft, and an annular sealing member is fixed to the other end.

5. The pivot assembly bearing according to claim 1, further comprising:
    at least one magnetic fluid seal between the shaft and the sleeve.

6. The pivot assembly bearing according to claim 5, wherein the communication path is a communication groove or a flat part formed on the outer peripheral surface of the sleeve.

7. The pivot assembly bearing according to claim 5, wherein the communication path is configured to communicate at least one end of the sleeve with an annular groove or a recessed part that is formed on the outer peripheral surface of the sleeve and communicates with the through hole.

8. A hard disk drive device comprising the pivot assembly bearing according to claim 1.

9. A pivot assembly bearing comprising:
    a shaft;
    a sleeve provided coaxially with the shaft; and
    a pair of rolling bearings arranged to be separated from each other in an axial direction between the shaft and the sleeve, wherein
    the sleeve includes a ventilation path configured to communicate a region surrounded by the shaft, the pair of rolling bearings and the sleeve with outside of the sleeve, and
    the ventilation path includes a groove formed at a portion of an inner peripheral surface of the sleeve which contacts an outer ring of one of the rolling bearings.

10. The pivot assembly bearing according to claim 9, further comprising:
    at least one magnetic fluid seal between the shaft and the sleeve.

11. A hard disk drive device comprising the pivot assembly bearing according to claim 9.

12. A pivot assembly bearing comprising:
    a shaft;
    a sleeve provided coaxially with the shaft; and
    a pair of rolling bearings arranged to be separated from each other in an axial direction between the shaft and the sleeve, wherein
    the sleeve includes a ventilation path configured to communicate a region surrounded by the shaft, the pair of rolling bearings and the sleeve with outside of the sleeve, and
    the sleeve includes a filter configured to close the ventilation path.

13. The pivot assembly bearing according to claim 12, further comprising:
    at least one magnetic fluid seal between the shaft and the sleeve.

14. The pivot assembly bearing according to claim 13, wherein the filter is fixed to at least one of an inner peripheral surface and an outer peripheral surface of the sleeve.

15. A hard disk drive device comprising the pivot assembly bearing according to claim 12.

16. A hard disk drive device comprising:
   a swing arm configured to move a magnetic head on a magnetic disc; and
   a pivot assembly bearing configured to support the swing arm in a swingable manner, the pivot assembly including:
      a shaft;
      a sleeve provided coaxially with the shaft; and
      a pair of rolling bearings arranged to be separated from each other in an axial direction between the shaft and the sleeve, wherein
      the sleeve includes a ventilation path configured to communicate a region surrounded by the shaft, the pair of rolling bearings, and the sleeve with outside of the sleeve,
   wherein the swing arm includes:
      a mounting hole into which the pivot assembly bearing is inserted; and
      a communication path on an inner peripheral surface of the mounting hole, the communication path communicating the ventilation path in the pivot assembly bearing with outside of the swing arm.

17. The hard disk drive device according to claim 16, further comprising:
   at least one magnetic fluid seal between the shaft and the sleeve.

* * * * *